United States Patent [19]
Shimada et al.

[11] Patent Number: 6,081,250
[45] Date of Patent: Jun. 27, 2000

[54] ACTIVE MATRIX DISPLAY DEVICE AND ITS DRIVING METHOD

[75] Inventors: Takayuki Shimada, Nara-ken; Toshihiro Yamashita; Yutaka Takafuji, both of Nara, all of Japan

[73] Assignee: Sharp Kabushiki Kaisha, Osaka, Japan

[21] Appl. No.: 08/266,159

[22] Filed: Jun. 27, 1994

Related U.S. Application Data

[63] Continuation of application No. 08/009,115, Jan. 26, 1993, abandoned.

[30] Foreign Application Priority Data

Jan. 31, 1992 [JP] Japan .................................. 4-016266

[51] Int. Cl.[7] ...................................................... G09G 3/36
[52] U.S. Cl. ............................................. 345/94; 345/208
[58] Field of Search ................................ 345/100, 89, 90, 345/94, 95, 208, 99, 204, 87; 359/54

[56] References Cited

U.S. PATENT DOCUMENTS

| | | | |
|---|---|---|---|
| 4,724,433 | 2/1988 | Inoue et al. | 345/87 |
| 4,785,297 | 11/1988 | Sekiya | 340/784 |
| 4,842,371 | 6/1989 | Yasuda et al. | 340/784 |
| 5,041,822 | 8/1991 | Hayashi | 340/784 |
| 5,253,091 | 10/1993 | Kimura et al. | 345/87 |

FOREIGN PATENT DOCUMENTS

| | | |
|---|---|---|
| 0 466 378 A2 | 1/1992 | European Pat. Off. . |
| 3-163529 | 7/1991 | Japan . |
| 3-163530 | 7/1991 | Japan . |
| 3-163531 | 7/1991 | Japan . |
| 2 146 478 | 4/1985 | United Kingdom . |

OTHER PUBLICATIONS

Patent Abstracts of Japan, vol. 14, No. 580 (E–1017) Dec. 25, 1990 & JP–A–02 252 378 (SONY) Oct. 11, 1990 (pp. 501–507).

Japan Display '89, Emoto et al: 0.92 in. Active–Matrix LCD With Fully Integrated Poly–Si TFT Drivers of New Circuit Configuration, pp. 152–154.

*Primary Examiner*—Regina Liang
*Attorney, Agent, or Firm*—Nixon & Vanderhye, P.C.

[57] ABSTRACT

To enhance the display quality by improving the writing characteristic of active matrix display device.

A plurality of signal lines of video signals are provided for pixels of each column arranged in two-dimensional array, and the driving element of each pixel is designed to be driven by any one of the signal lines, so that the scanning time of each line may be extended longer than one horizontal scanning period.

13 Claims, 8 Drawing Sheets

ACTIVE MATRIX DISPLAY DEVICE AND ITS DRIVING METHOD

This is a continuation of application Ser. No. 08/009,115, filed Jan. 26, 1993, now abandoned.

BACKGROUND OF THE INVENTION

1. Field of the Invention

The present invention relates to an active matrix display device used in liquid crystal display device and the like, and its driving method.

2. Description of the Related Art

FIG. 1 shows an example of construction of active matrix liquid crystal display device having pixels of n rows and m columns in the prior art. A basic constitution of such prior art is disclosed, for example, in pages 152–154 of JAPAN DISPLAY '89. In the prior art shown in FIG. 1, additional capacitances are connected in parallel with the pixel (electrically equivalent to capacitance). In the drawing, numeral 603 is a switching element composed of a thin film transistor (hereinafter called TFT), which is turned on or off by a gate signal sent from a gate driving circuit 609 through a gate bus line 601. Numeral 608 denotes a source driving circuit, which is composed of analog switches 610 for sampling video signals sent from a video signal line 612 and writing into source bus line capacities 607, and a shift register 613 for sending the sampling control signal to gate electrode 611 of the analog switch.

A video signal supplied to the source bus line 602 through the source driving circuit 608 is written into a pixel 606, which is equivalent to the capacitance being composed of a liquid crystal held between a pixel electrode disposed on each pixel and a counter electrode on a counter substrate, and into an additional capacitance 605 for compensating the capacitance of the pixel being connected in parallel with pixel 606 when the potential of the gate pulse line 601 becomes high and the pixel TFT 603 is turned off.

One terminal of this additional capacitance 605 is connected to the pixel electrode, and the other is connected to a grounded additional capacitance line 604. The written signal is held in the OFF state of the TFT 603, but by installing the additional capacitance 605, the holding characteristic of this signal may be improved, or the fluctuations of characteristics due to anisotropy of dielectric constant of the liquid crystal may be alleviated.

FIG. 2 and FIG. 3 show examples of driving waveforms of conventional active matrix liquid crystal display device. FIG. 2 depicts signal waveforms delivered from the gate driving circuit 609 into individual gate bus lines $X_1$, $X_2$ - - - $X_n$ during one field. The signal "H" corresponds to the ON state of the pixel TFT 603, and "L" to the OFF state. Thus, in the sequence of the gate bus lines $X_1$, $X_2$ - - - $X_n$, the signal "H" is issued, and the pulse width of the output is nearly equal to the horizontal scanning time (known as "1H"). In this period of "1H", for on/off control of the analog switch 610 in the source driving circuit 608, control signals having the waveform as shown in FIG. 3 are applied to the gate electrode of each analog switch 610.

The diagram shows the waveform when the i-th and i+1-th gate bus lines $X_i$, $X_{i+1}$, are ON, as is similar in other cases. In this example, incidentally, the timing of change of the potential of the i-th gate bus line $X_i$ from "H" to "L" coincides with the timing of change of the potential of the (i+1)-th gate bus line $X_{i+1}$ from "L" to "H". In this period of 1H, the m analog switches 610 are sequentially turned on, and the video signals are written into the source bus lines 602.

A finite time t1 must be provided from the moment of the previous stage gate bus line $X_{i-1}$ becoming L until the first analog switch 610 is turned on by the control signal $Y_1$. This is because the resistance of the gate bus line 601 is finite and the potential change is delayed. That is, if a video signal is written in the source bus line 602 by turning on the analog switch 610 by control signal $Y_1$ before the previous stage gate bus line $X_{i-1}$ becomes sufficiently "L", since the resistance of the pixel TFT 603 connected to the previous stage gate bus line $X_{i-1}$ is not sufficiently increased, the signal written in the previous stage pixel 606 may be disturbed by the video signal corresponding to the pixel 606 of this stage.

As a result, the display of the previous stage pixel is a mixture of the video signal for the previous stage and the video signal for the next stage, and the resolution is lowered. Therefore, the time t1 should be set sufficiently long in order to decrease the effect of delay time of the gate bus line 601. Likewise, a finite time t2 must be provided from the moment of turning on the final analog switch 610 by control signal $Y_m$ until the potential of the gate bus line 601 is lowered to "L". This is because a finite time is required for writing signals into the pixel 606 and additional capacitance 605 through the pixel TFT 603, and discharging the written charge through the additional capacitance wiring 604, and the video signal cannot be sufficiently written into the pixel 606 unless a sufficiently long time is taken.

It was thus a feature of the conventional active matrix liquid crystal display device that only one source bus line 602 was connected to each pixel 606. In the driving method of the conventional active matrix display device, it was a feature that the ON time of each gate bus line 601 did not exceed the horizontal scanning time.

In the conventional active matrix type liquid crystal display device, the greater the number of pixels, the higher becomes the resolution, and a favorable display quality may be obtained. However, as the number of pixels increases, several technical problems occur. For example, delays of the gate bus line and additional capacitance common line are noted. The line resistance and additional capacitance are both proportional to the number of pixels in the horizontal direction. Therefore, the time constant of delay of these lines is nearly proportional to the square of the number of pixels in the horizontal direction. Hence, as the number of pixels increases, the line delay increases noticeably. Accordingly, the times t1, t2 must be extended.

In the display device having a great number of pixels, however, the horizontal scanning time becomes shorter. As a result, sufficiently long duration cannot be taken for times t1, t2 in order to decrease the effect of delay, which results in an increase of the effect of delay. When such effect of line delay increases, deterioration of display quality or the like may occur at one end of the screen. It is hitherto very difficult to improve the resolution without sacrificing the display quality. Besides, along with the increase of the number of pixels, the signal writing time for one pixel becomes shorter in proportion. Hence, it is also a problem that a faster writing speed of signal is required.

The present inventors have previously disclosed some improved inventions in the Japanese Patent Publications No. 163529/1991 and No. 163530/1991, with the purpose of reducing the effect of signal delay on display quality. In these inventions, by lowering the resistance of the additional capacitance line, the signal writing speed is enhanced.

It is similarly an object of the present invention to reduce the effect of signal delay on display quality. In the invention, however, this object is achieved by completely different means for substantially extending the writing time.

To achieve the above object, the invention presents an active matrix display device comprising pixels in two-dimensional arrangement, and having each pixel provided with a driving element for driving the pixel, wherein a plurality of signal lines for feeding signals to driving elements of pixels in each column are formed at each column, so that the successive rows of driving elements of the pixels in a column are connected to and successive ones driven by any the plurality of signal lines.

In the invention, the pixel driving element of each row is arranged to be driven by a column signal from a signal line different from the driving element of the adjacent row.

Also in the invention, the pixel driving element in each row comprises means for successively generating signals and for supplying the signals to the pixel driving element of each row to make active during the scanning time which is a product of one horizontal scanning time and a number of signal lines formed in each column.

In the invention, the pixel driving elements are constructed as thin film transistors. In the invention, the signal provided for each column driving element is kept by capacity of signal line for the moment.

The invention also presents a driving method of an active matrix display device for driving a matrix display device, which is composed of pixels in two-dimensional arrangement, and driving elements disposed at each pixel for driving by means of selection signal for each row and video signal for each row wherein a plurality of signal lines for feeding signals to driving elements of pixels in each column are formed, and the successive rows of driving elements of pixels in a column are connected to and driven by successive ones of the plurality signal lines, so that the scanning time of the selection signal, when the driving element for driving pixels of each row is active, may be a product of one horizontal scanning time and a number of signal lines formed in each column.

In the invention, the driving elements of pixels of each column are constructed so that the driving element of pixels of each adjacent row may be driven by a video signal from a different signal line.

Also in the invention, the driving elements of pixels of each row are provided with a selection signal sequentially for making active only during the scanning time, while deviating the section signal by a predetermined time.

In the invention, moreover, the driving elements of pixels of each row are provided with a video signal through one of the signal lines forming in a plurality at each column, after each row is made active by a selection signal and before the next row is made active by a selection signal.

According to the above constitution, if ON signals are simultaneously sent to a plurality of adjacent gate bus lines, video signals to be written into adjacent pixels across gate bus lines will not be mixed mutually. Therefore, the output width of the ON signal sent out to each gate bus line may be set longer than the time assigned for one gate bus line. As a result, the time for decreasing the delay effect of signal line may be extended, and the effect of line delay may be decreased if the number of pixels is increased, so that the display quality may be enhanced.

The invention is thus constructed so that the sum $t1+t2+t3$ can be extended to 2H and so forth, where the time t1 is from the moment when the gate bus line becomes high until reading of video signal to the first source bus line begins, the time t2 is from the moment when the video signal is read out to the final source bus line until the output of the gate bus line falls, and the time t3 is required to read out the video signal for pixel array if one row. In the conventional driving wave form, the sum is one horizontal time (1H). Therefore, the duration of t1, t2, t3 can be extended, and the effect of the line delay is lessened accordingly, so it is possible to present a display device, which is excellent in writing characteristics of the pixel transistor.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
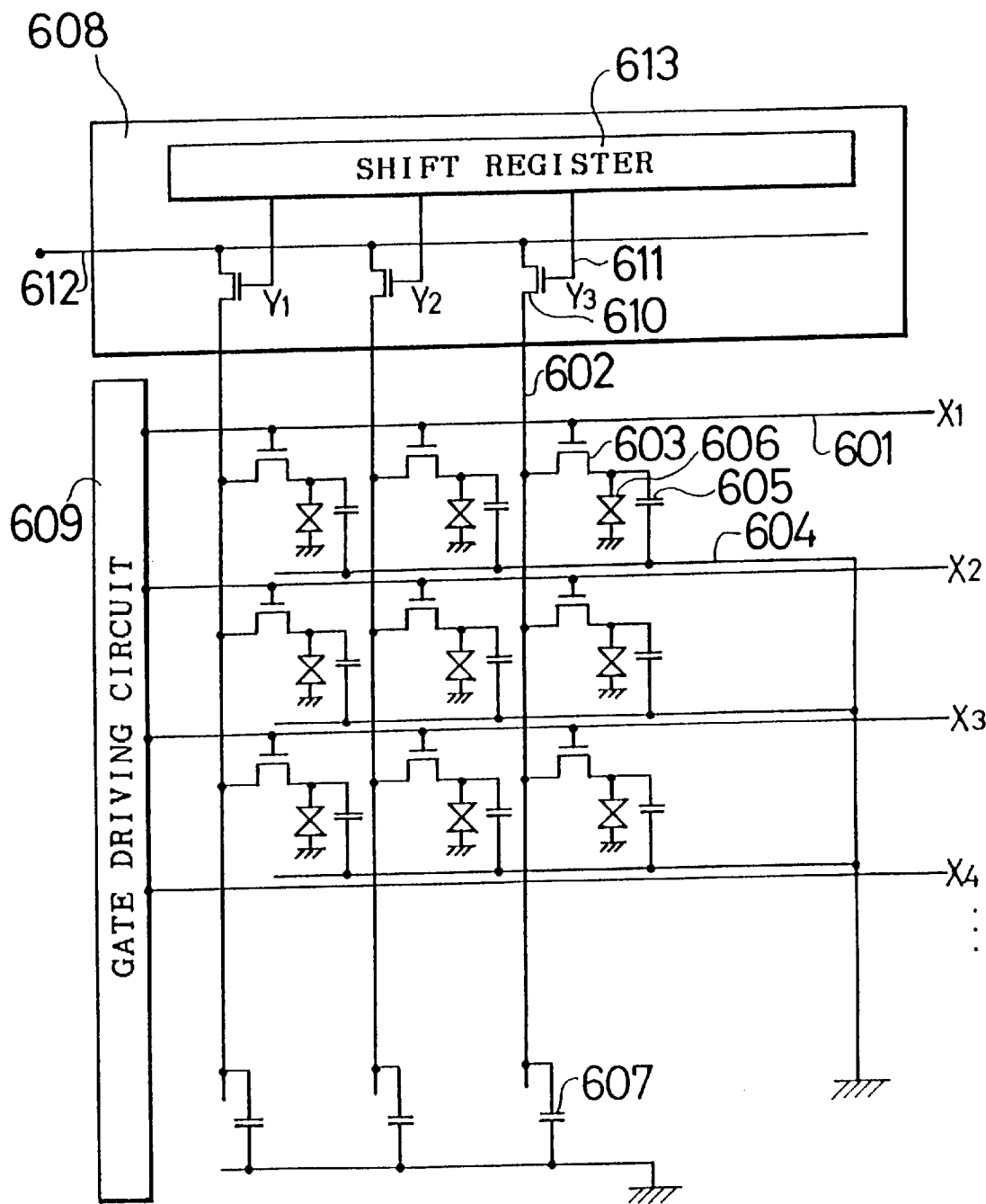
FIG. 1 is a structural diagram of a prior art.
Figure 2:
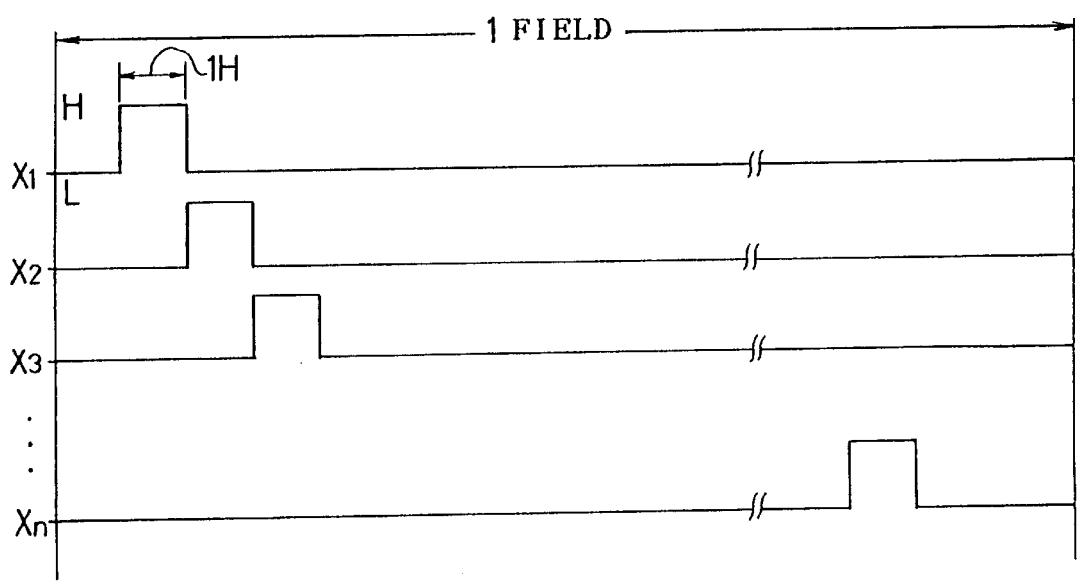
FIG. 2 is an operation explanatory diagram of FIG. 1.
Figure 3:
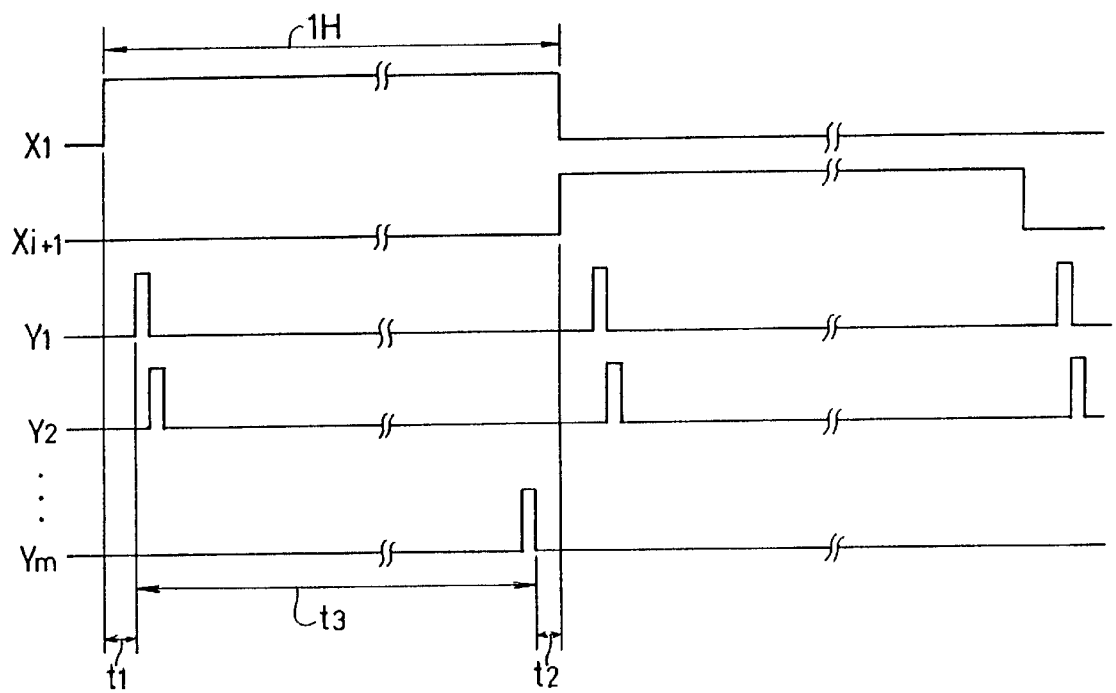
FIG. 3 is an operation explanatory diagram of FIG. 1.

Now referring to the drawing, preferred embodiments of the invention are described below.

Figure 4:
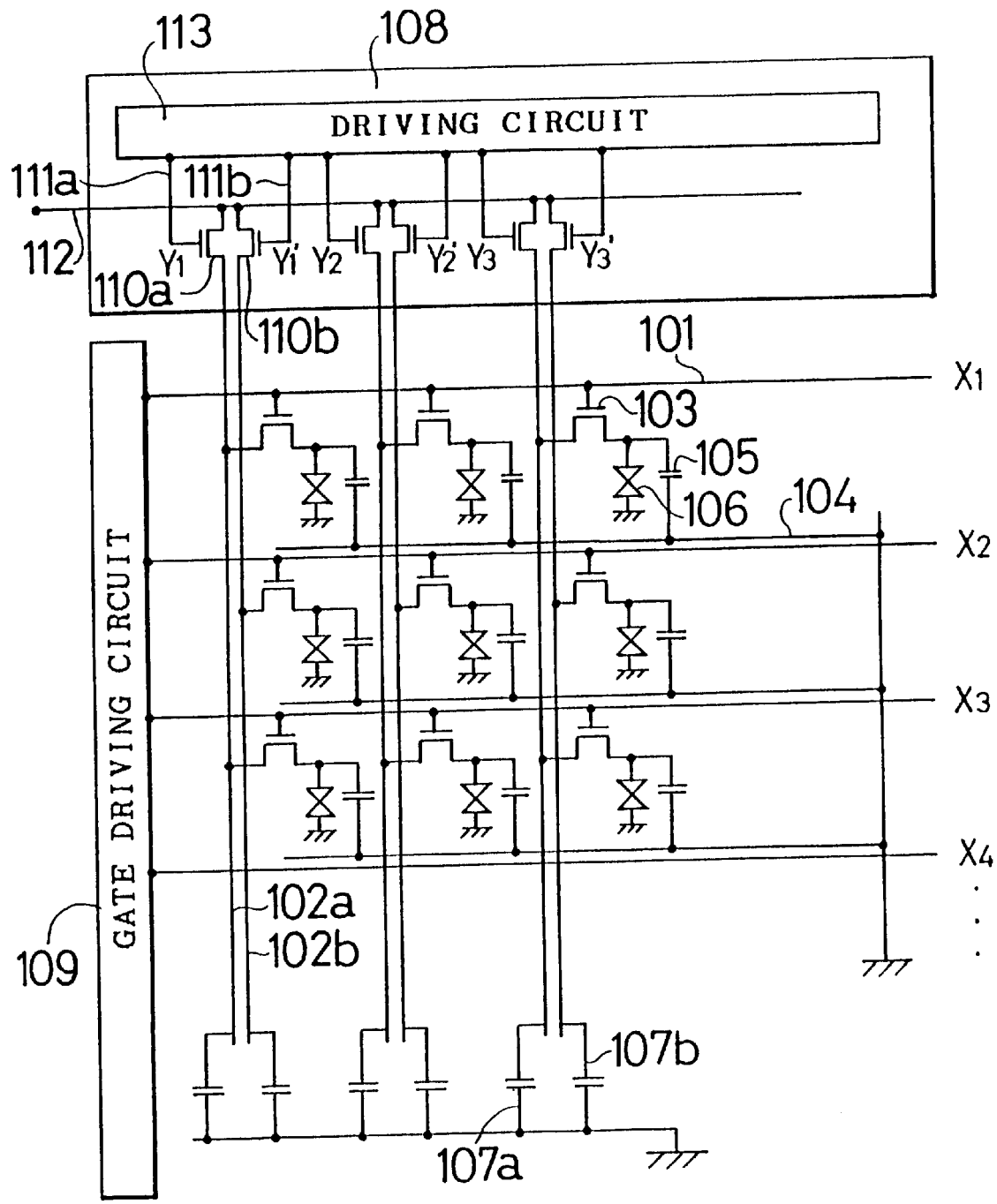
FIG. 4 is a structural diagram of an embodiment of the invention.
Figure 7:
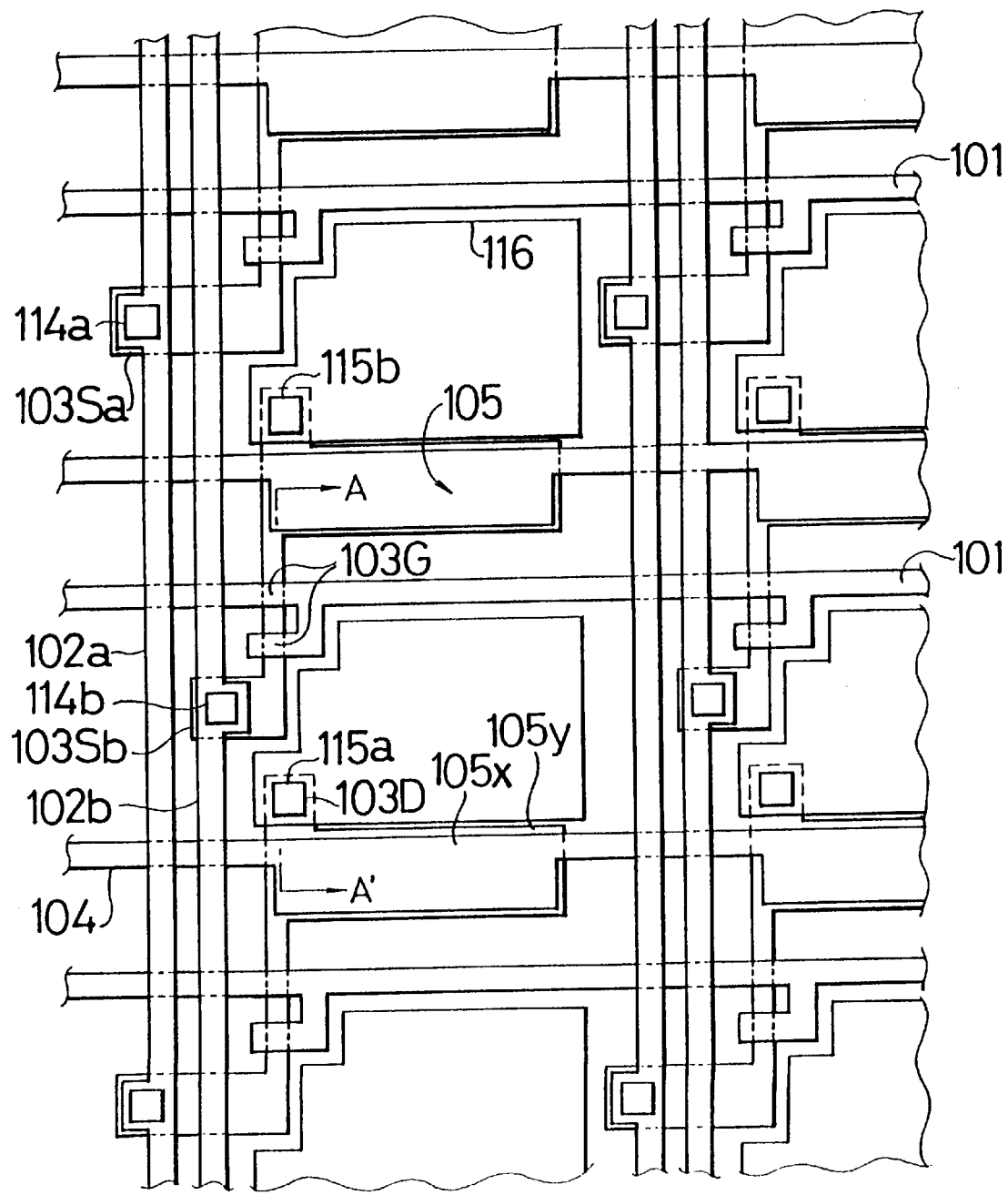
FIG. 7 is a plan structural diagram showing a practical constitution of essential part of FIG. 4.

FIG. 4 shows an example of circuit construction of an active matrix display device according to the invention. FIG. 7 further shows an example of layout for TFT array part of this active matrix display device. Herein, numeral 101 denotes a gate bus line, which is connected to a gate electrode 103G of a pixel TFT 103 composed of two TFTs connected in series. Numeral 109 is a gate driving circuit, which sends out an on/off signal for the pixel TFT 103 to the gate bus line 101.

Numeral 108 is a source driving circuit, which is composed of analog switches 110*a*, 110*b* interposed between a video signal line 112 and source bus lines 102*a*, 102*b*, and a driving circuit 113 for sending out the on/off control signals of the analog switches 110*a*, 110*b* to the gate electrodes of the analog switches 110*a*, 110*b*. The video signal is sent out to the source bus lines 102*a*, 102*b* through the source driving circuit 108 at adequate timing, written into capacitances 107*a*, 107*b* of the 107*b* of the source bus lines, and further written into a specific pixel through the pixel TFT 103 in ON state.

The written video signal is written, in the OFF state of the pixel TFT 103, into a pixel 106 which is equivalent to a capacitance formed with a liquid crystal held between a pixel electrode 116 and a counter electrode and into an additional capacitance 105 connected in parallel with the pixel. One electrode 105*x* of the additional capacitance 105 is connected to an additional capacitance common line 104, and is grounded. In one pixel array, a pair of source bus lines 102*a*, 102*b* are disposed, which are connected alternately on every other row to source electrodes 103S*a*, 103S*b* of the pixel TFT 103 through contact holes 114*a*, 114*b*, respectively as shown in FIG. 7.

A drain electrode 103D of the pixel TFT 103 is connected to the other electrode 105*y* of the additional capacitance 105 and to a pixel electrode 116 through contact holes 115*a*, 115*b* as shown in FIG. 7.

Figure 8:
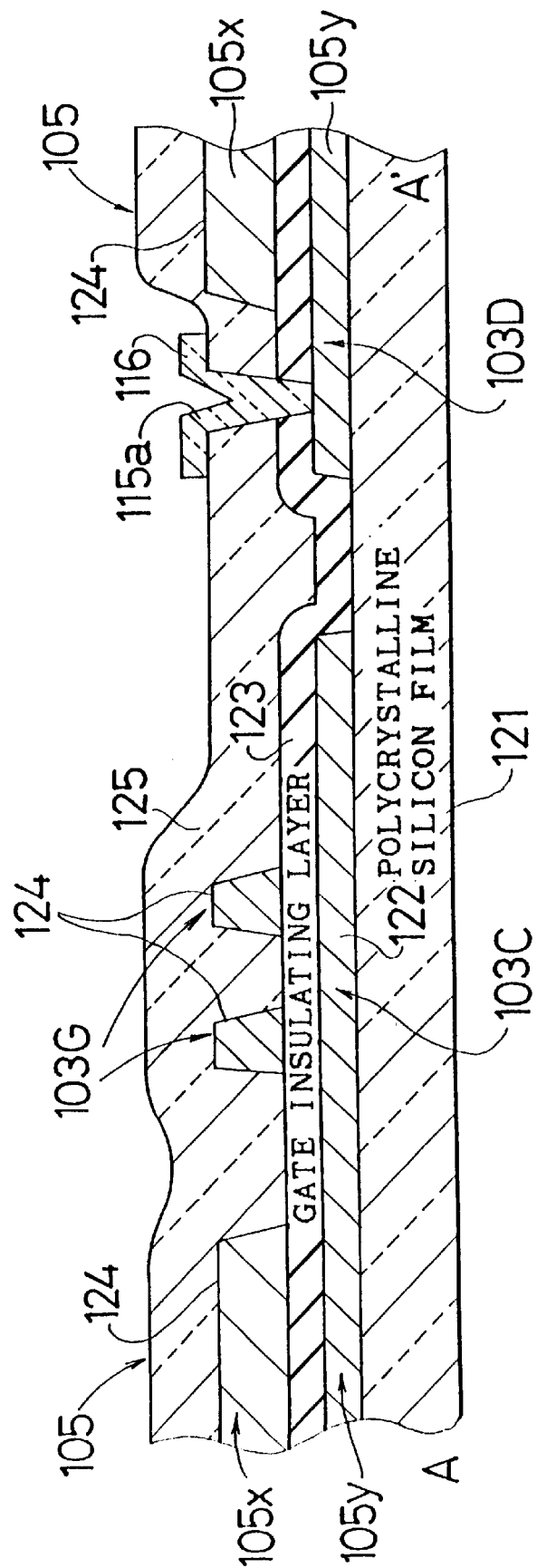
FIG. 8 is a sectional view from line A–A' of FIG. 7.

A sectional structure along line A–A' of FIG. 7 is shown in FIG. 8. On a transparent insulating substrate 121, a polycrystal line silicon film 122 serving as a channel portion 103c of the TFT 103 and the other electrode 105y of the additional capacitance 105, a gate insulation film 123, and a polycrystal line silicon film 124 doped with impurities serving as the gate electrode 103G of the TFT 103 and the one electrode 105x of the additional capacitance 105 are formed in this order. In specified part s of the polycrystalline silicon film, impurities are doped by ion implantation method. An insulating film 125 is formed in the upper part of the polycrystalline silicon film 124, and the contact hole 115a is opened, and the pixel electrode 116 is formed by wiring such as source bus line of low resistance metal like as Al, and transparent conductive thin film like as ITO.

Figure 5:
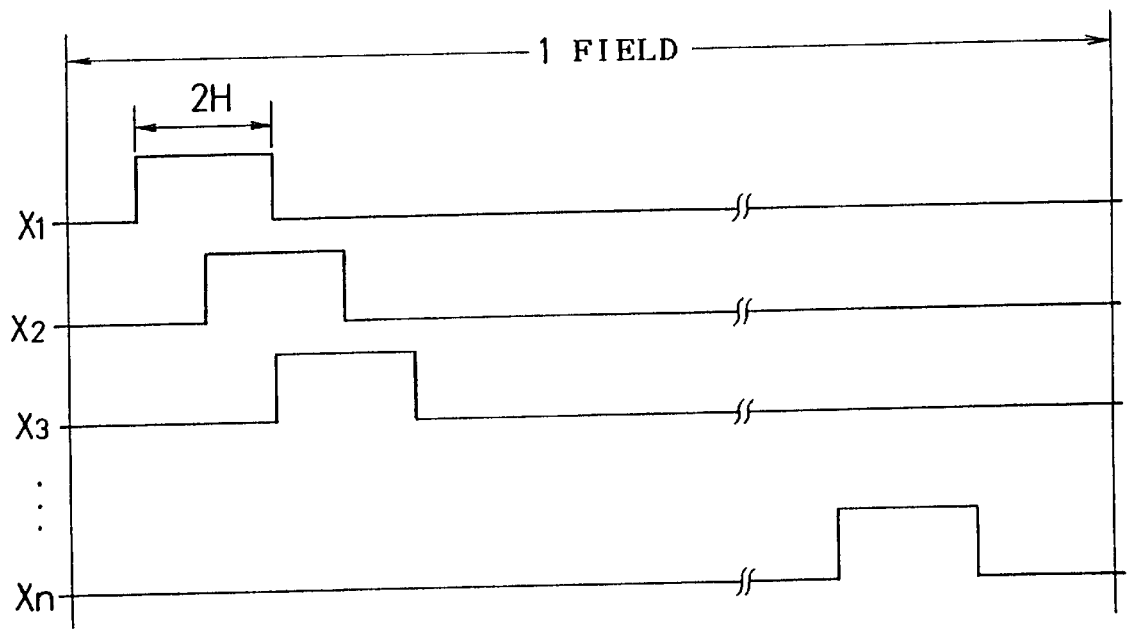
FIG. 5 is an operation explanatory diagram of FIG. 4.
Figure 6:
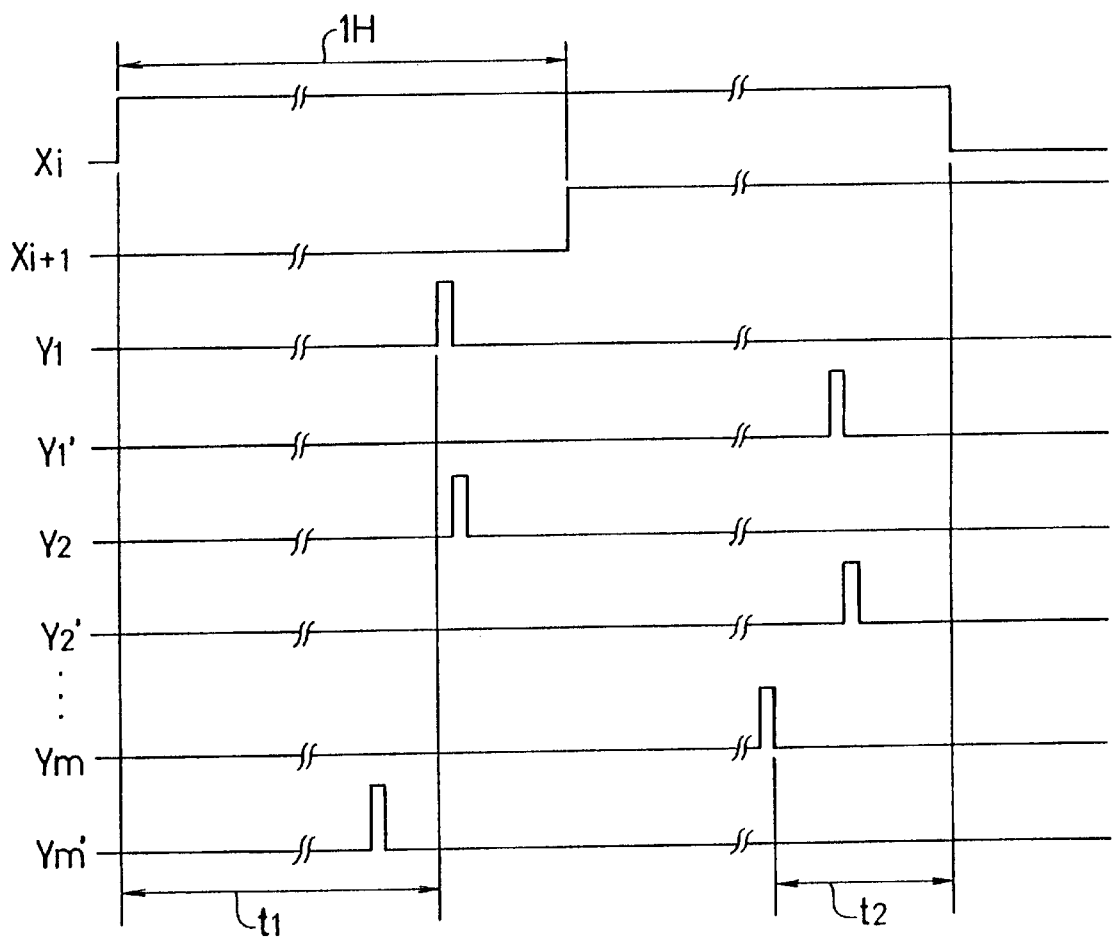
FIG. 6 is an operation explanatory diagram of FIG. 4.

FIG. 5 and FIG. 6 show driving waveforms in the embodiment. FIG. 5 shows the signal waveform in one vertical scanning period (one field) sent out to gate bus lines $X_1$ through $X_n$. When the potential to each gate bus lines $X_1$ $X_n$ becomes "H" level, the transistors the gate electrodes to which the gate bus lines $X_1$ to $X_n$ are connected, are turned on at the same time. In each gate bus line, the ON signal is sent out for the double duration of one horizontal scanning period (1H). The gate bus lines $X_1$ to $X_n$ send out signals at the timing shifted by the time of 1H sequentially as shown in FIG. 5, and the output pulses of adjacent gate bus lines are overlapped by the duration of 1H.

FIG. 6 shows the detail about driving waveform in two horizontal scanning periods (2H). In the drawing, $X_i$ and $X_{i+1}$ are driving waveforms of the i-th and (i+1)-h gate bus lines respectively. Additionally $Y_1$, $Y'_1$, $Y_2$, $Y'_2$, to $Y_m$, $Y'_m$ are gate signals to be fed into gate electrodes of the analog switches 110a, b respectively, and when the gate signal becomes "H", the corresponding analog switches 110a, b are turned on, and the video signal sent from the video signal line 112 is written into specific source bus lines 102a, b, and the video signal is further written into the specific pixel through the pixel TFT 103 in ON state.

In this embodiment, first the gate bus line $X_i$ becomes "H", and t1 time later the gate signal $Y_1$, of the analog switch 110a becomes "H", and the video signal is written in the corresponding source bus line, "H" is sent out on the previous stage gate bus line $X_{i-1}$. However, since the source bus line corresponding to the gate signal $Y_1$ is not connected to the TFT connected to the gate bus line $X_{i-1}$, a mixture of video signal does not occur because of the difference in the pulse width of the gate bus line.

In the embodiment, by installing two source bus lines for one pixel column, the pulse width of each gate bus line is set twice as long as one horizontal scanning period for driving in the state free from mixture of video signals but the effect of the embodiment is not limited to this case alone, and when more source bus lines are provided, the output pulse width of the gate bus line may be set as many times as the number of source bus lines per pixel column in one horizontal scanning period.

Further in the embodiment, the writing time of video signal may be extended. By once converting the incoming video signal into a digital signal, storing the digital signal into a memory and converting the stored signal into an analog signal again at specific timing, the writing time of the video signal for each pixel may be extended. As a result, the required characteristic of the analog switch may be alleviated, and the writing characteristic of the video signal is further enhanced, so that the display quality may be more improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An active matrix display device comprising:

a plurality of pixels arranged two-dimensionally in columns and rows, a plurality of driving elements wherein a driving element is provided for each pixel to drive the pixel, and wherein a group of signal lines for feeding signals to the driving elements are provided for each column of pixels and each driving element of a column is connected to a selected one of said group, so that the driving elements of each adjacent pixel in a column are driven by a different selected one of the signal lines from said group of signal lines and the driving elements provided for each row of pixels are connected to the same selected one in each group of signal lines provided for each column of pixels, a plurality of gating signal lines wherein each of the gating signal lines is connected to the driving elements of a single row of pixels so that each gating signal line provides an ON state gating signal to the driving elements of a different respective row of pixels, and wherein the time necessary to feed the signals from said group of signal lines for each column to each driving element of a row of pixels is substantially less than an ON state gating signal time of said row of pixels.

2. An active matrix display device as in claim 1, further comprising means for successively generating and supplying the ON state gating signals to the pixel driving elements of each row for successively driving each row for a time which is a product of the time necessary to feed the signals from said group of signal lines to each driving element of a row of pixels and the number of signal lines in said group for each column.

3. An active matrix display device as in claim 1, wherein the pixel driving element is a thin film transistor.

4. An active matrix display device as in claim 1, wherein the signal provided for each column driving element is temporarily capacitively stored by capacitor means for each signal line.

5. An active matrix display device as in claim 1 wherein the time necessary to feed the signals from the group of signal lines for each column to the driving elements of a row of pixels is substantially one half the ON state gating signal time.

6. An active matrix display device as in claim 1 wherein the device pixels are driven in a noninterlaced scanning mode.

7. A driving method of an active matrix display device, which is composed of pixels in a two-dimensional arrangement of columns and rows with a driving element disposed at each pixel, for driving by means of a selection signal for each row and video signals for each column, said method comprising:

forming a plurality of signal lines in each column for feeding signals to the driving elements of pixels in each column, and driving the driving element of each pixel of a column by a selected one of the signal lines, so that the driving elements of each adjacent pixel in a column is driven by a different selected one of the plurality of signal lines, forming a plurality of row selection lines wherein each row selection line provides a row selection signal to a single row of driving elements and generating row selection signals so that the time that a row selection signal for each row of driving elements is active is substantially greater than the time necessary to provide said video signals for each column to the driving elements of a row and wherein the driving elements provided for each row of pixels are connected to the same selected one in each group of signal lines provided for each column of pixels.

8. A driving method of an active matrix display device as in claim 7, further comprising: sequentially providing the driving elements of pixels of each row with an active row selection signal for sequentially making said rows active and shifting the active time of a row selection signal for each sequential row for a predetermined time.

9. A driving method of an active matrix display device as in claim 8, wherein the driving elements of pixels of each row are provided with a video signal through one of the plural signal lines formed in each column, after each row is made active by a selection signal and before the next row is made active by a selection signal.

10. A driving method of an active matrix display device as in claim 7, wherein the signal provided for each column driving element by each signal line is temporarily capacitively stored.

11. A driving method as in claim 7 wherein the time that a row selection signal is active is substantially twice the time necessary to provide the video signals for each column to the driving elements of a row.

12. A driving method as in claim 7 wherein the device pixels are driven in a noninterlaced mode.

13. A driving method as in claim 7 wherein the time that a row selection signal is active is a product of the time necessary to provide said video signals for each column to the driving elements of a row and the number of the plurality of lines formed in each column.

* * * * *